US010704707B2

(12) United States Patent
Johanning et al.

(10) Patent No.: US 10,704,707 B2
(45) Date of Patent: Jul. 7, 2020

(54) MANUFACTURE OF ACTUATORS AND CONTROL VALVE ASSEMBLIES

(71) Applicant: Dresser, Inc., Addison, TX (US)

(72) Inventors: Jeffrey Louis Johanning, Ponte Vedra, FL (US); Mark David Kaczmarek, Middleburg, FL (US); Abdul Raoof Mohamed, Jacksonville, FL (US); Jayesh K. Shah, Palantine, IL (US); Casey Michael Stockbridge, Orange Park, FL (US); Orie Woodman Van Doran, Saint Johns, FL (US)

(73) Assignee: Dresser, LLC, Houston, TX (US)

( * ) Notice: Subject to any disclaimer, the term of this patent is extended or adjusted under 35 U.S.C. 154(b) by 314 days.

(21) Appl. No.: 15/473,834

(22) Filed: Mar. 30, 2017

(65) Prior Publication Data

US 2018/0080574 A1    Mar. 22, 2018

Related U.S. Application Data

(60) Provisional application No. 62/331,997, filed on May 5, 2016.

(51) Int. Cl.
*F16K 31/163* (2006.01)
*F16K 27/00* (2006.01)
*F16K 37/00* (2006.01)
*F16K 31/52* (2006.01)
*F16K 31/56* (2006.01)

(52) U.S. Cl.
CPC ............ *F16K 31/163* (2013.01); *F16K 27/00* (2013.01); *F16K 31/1635* (2013.01); *F16K 31/52* (2013.01); *F16K 31/563* (2013.01); *F16K 37/0016* (2013.01); *F16K 37/0058* (2013.01)

(58) Field of Classification Search
CPC .... F16K 31/163; F16K 27/00; F16K 31/1635; F16K 31/52; F16K 31/563; F16K 37/0016; F16K 37/0058
See application file for complete search history.

(56) References Cited

U.S. PATENT DOCUMENTS

| 3,818,808 | A | * | 6/1974 | Shafer | F01B 1/12 |
| | | | | | 92/138 |
| 6,076,799 | A | * | 6/2000 | Baumann | F16K 31/5282 |
| | | | | | 251/285 |
| 6,138,712 | A | * | 10/2000 | Hirose | F16K 31/163 |
| | | | | | 137/556 |
| 2010/0288956 | A1 | * | 11/2010 | Dordoni | F16K 31/1635 |
| | | | | | 251/213 |
| 2018/0080574 | A1 | * | 3/2018 | Johanning | F16K 31/1635 |

OTHER PUBLICATIONS

GE Oil & Gas, "Becker Control Valve Products," 2015.

* cited by examiner

*Primary Examiner* — Vicky A Johnson
(74) *Attorney, Agent, or Firm* — Paul Frank + Collins P.C.

(57) ABSTRACT

An actuator for use in a control valve assembly that has a structure amenable to manufacture. The actuator may comprise a housing comprising a plurality of walls secured to one another with fasteners to form an interior cavity, a torque hub disposed in the interior cavity, the torque hub comprising a torque body and a torque arm that are releasably engaged with one another via fasteners, each of the torque body and the torque arm having interfacing geometry that defines surfaces that engage with opposing surfaces on the other; and a load generator coupled with the torque hub.

10 Claims, 20 Drawing Sheets

MANUFACTURE OF ACTUATORS AND CONTROL VALVE ASSEMBLIES

CROSS-REFERENCE TO RELATED APPLICATIONS

This application claims the benefit of priority to U.S. Provisional Application Ser. No. 62/331,997, filed on May 5, 2016, and entitled "CONTROL VALVE ASSEMBLY," the content of which is incorporated by reference herein in its entirety.

BACKGROUND

Flow controls are important in many industries. Whether found on process lines, gas distribution networks, or like systems that carry flowing material, flow devices like valve assemblies (or "control valves" or "control valve assemblies") are vital to regulate material flow within set parameters or, in case of problems, shut-off flow altogether. In this regard, control valve assemblies may include a valve that couples in-line with the system to receive a flow of material. The valve may have components that move (e.g., translate, rotate, etc.) to restrict or permit this flow. An actuator often accompanies the valve. The actuator provides force necessary to cause this movement. In some industrial applications, torque required to operate the valve under high pressure may well exceed 800,000 in/lbs.

SUMMARY

The subject matter of this disclosure relates to actuators as well as control valve assemblies. Of particular interest herein are improvements to simplify construction of actuators but still meet these rigorous performance demands. In oil & gas industries, for example, the embodiments may operate valve assemblies on pipelines that flow natural gas and oil at high pressures. As noted more below, the embodiments here package components to achieve such operability in a way that is both simple to construct and robust to adapt to a particular installation or application. These features reduce the need for secondary processing (e.g., machining, welding, etc.) and, more generally, reduce labor time and costs to move the actuator from assembly to installation at a customer site.

BREIF DESCRIPTION OF THE DRAWINGS

Figure 1:
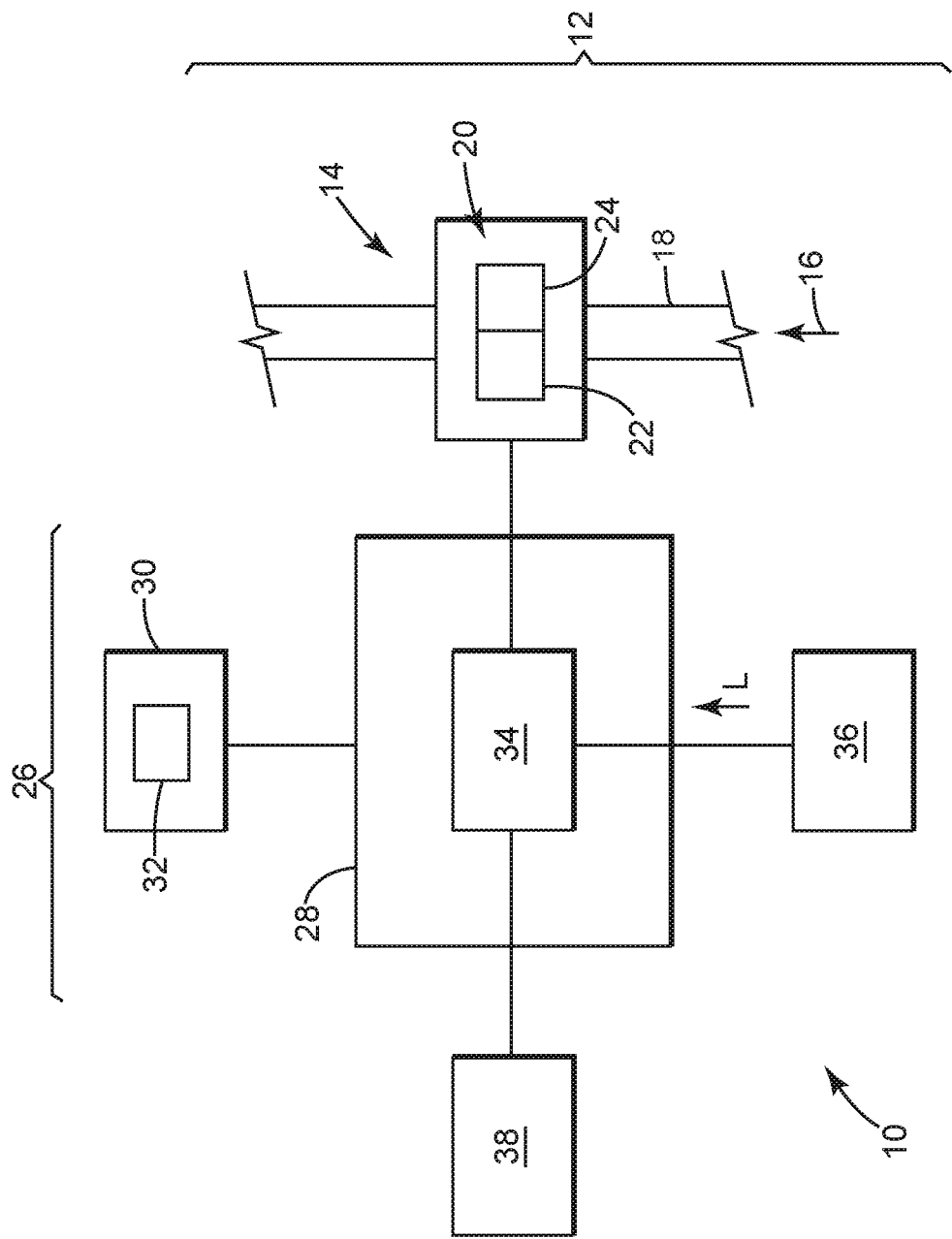
Figure 2:
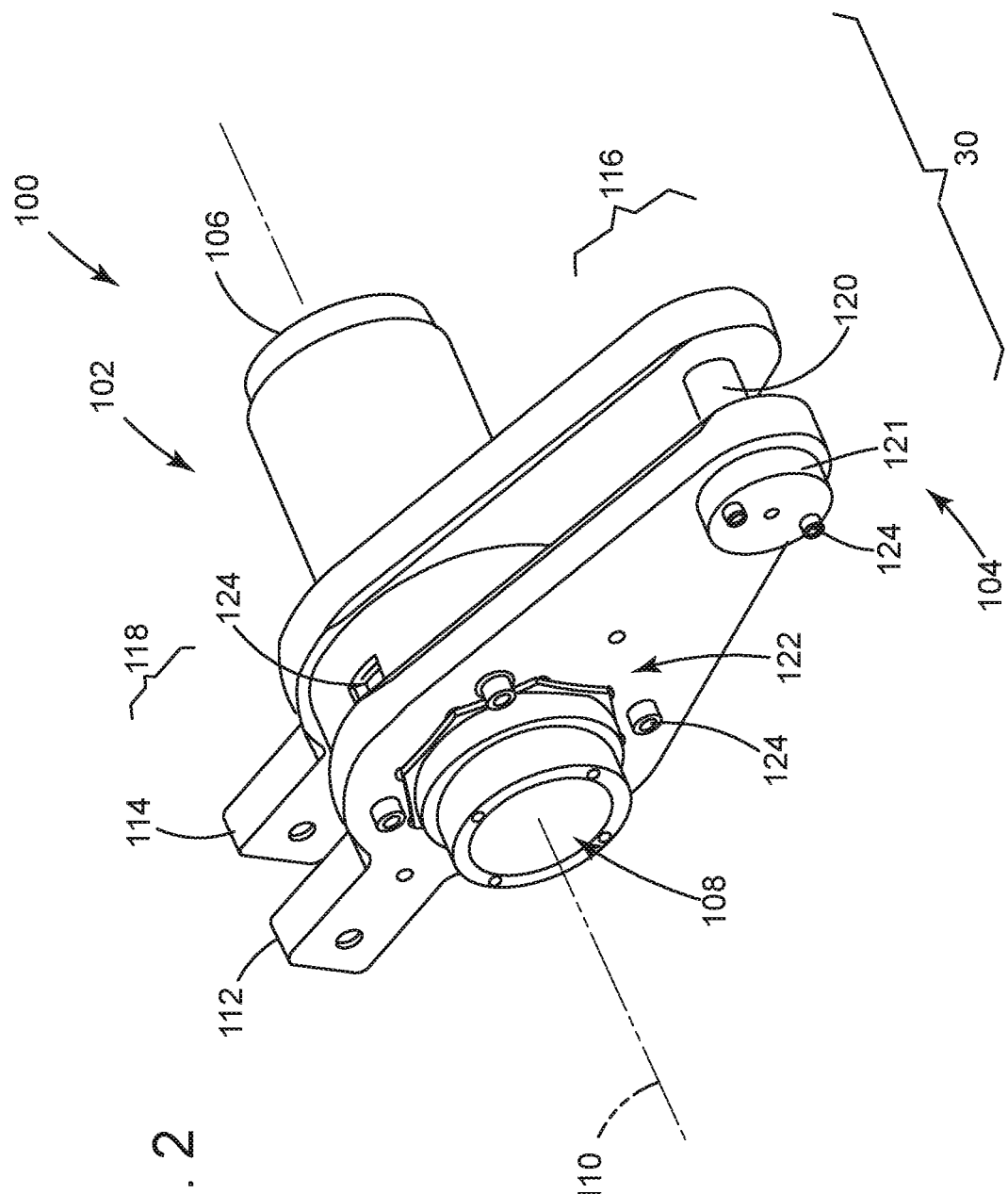
Figure 3:
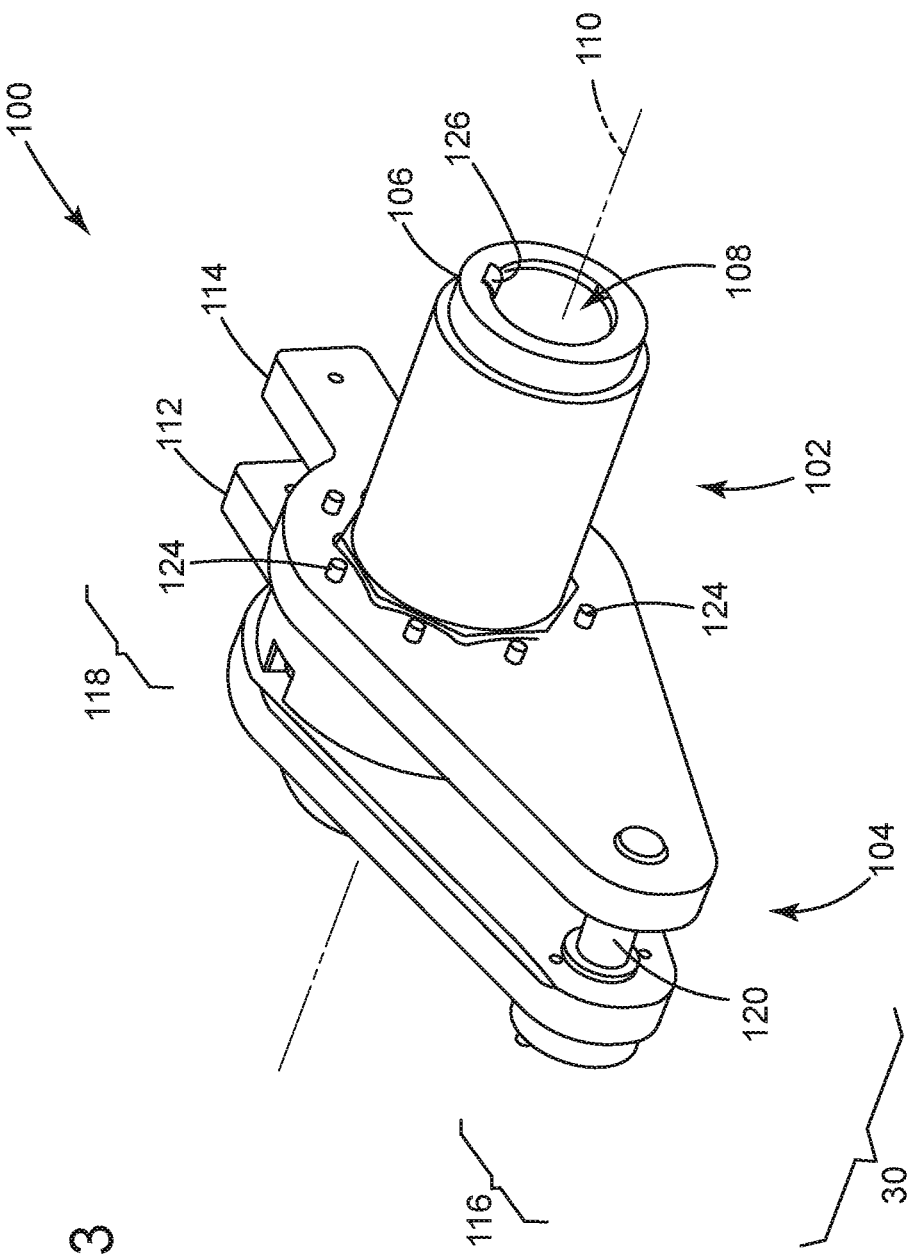
Figure 4:
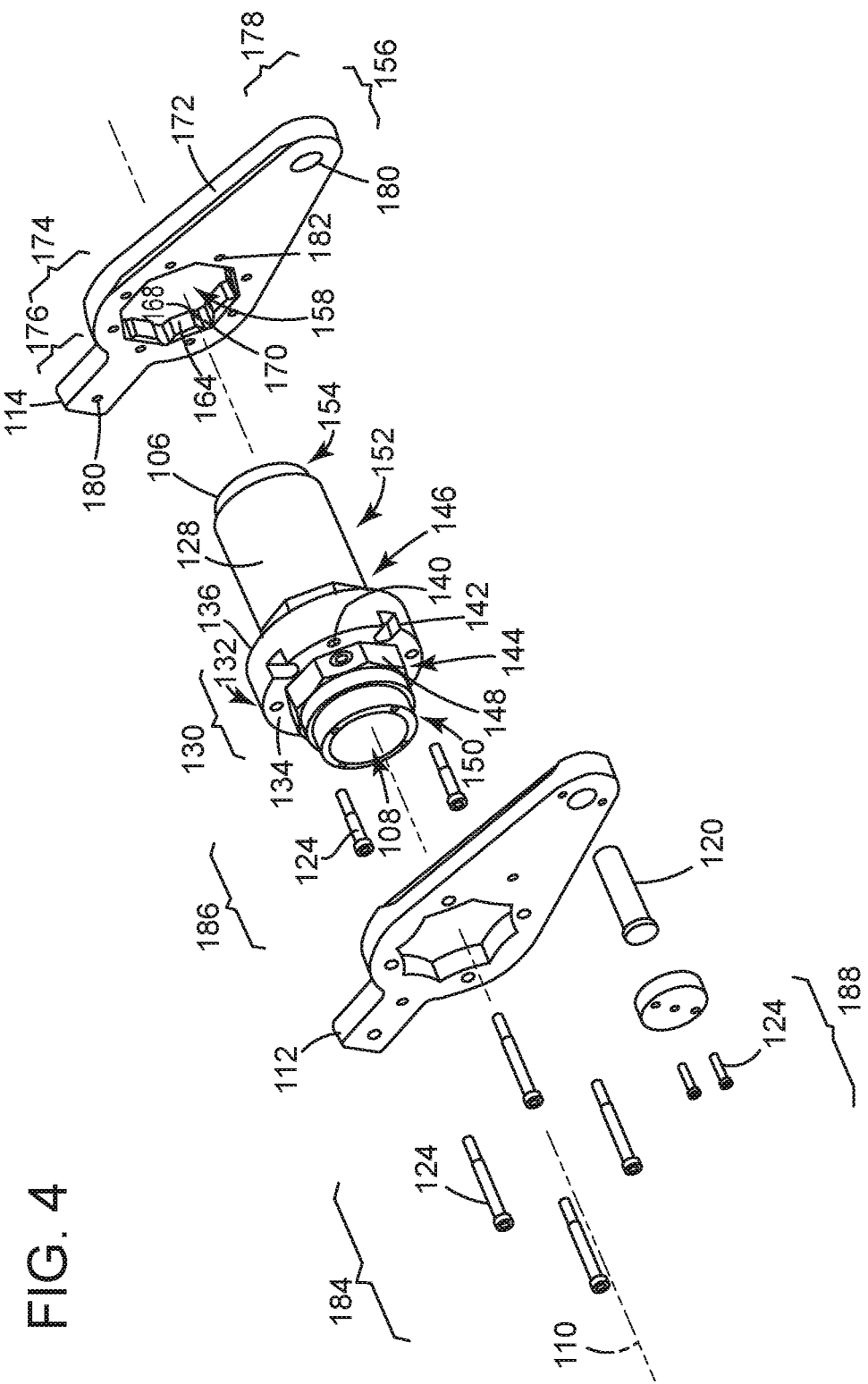
Figure 5:
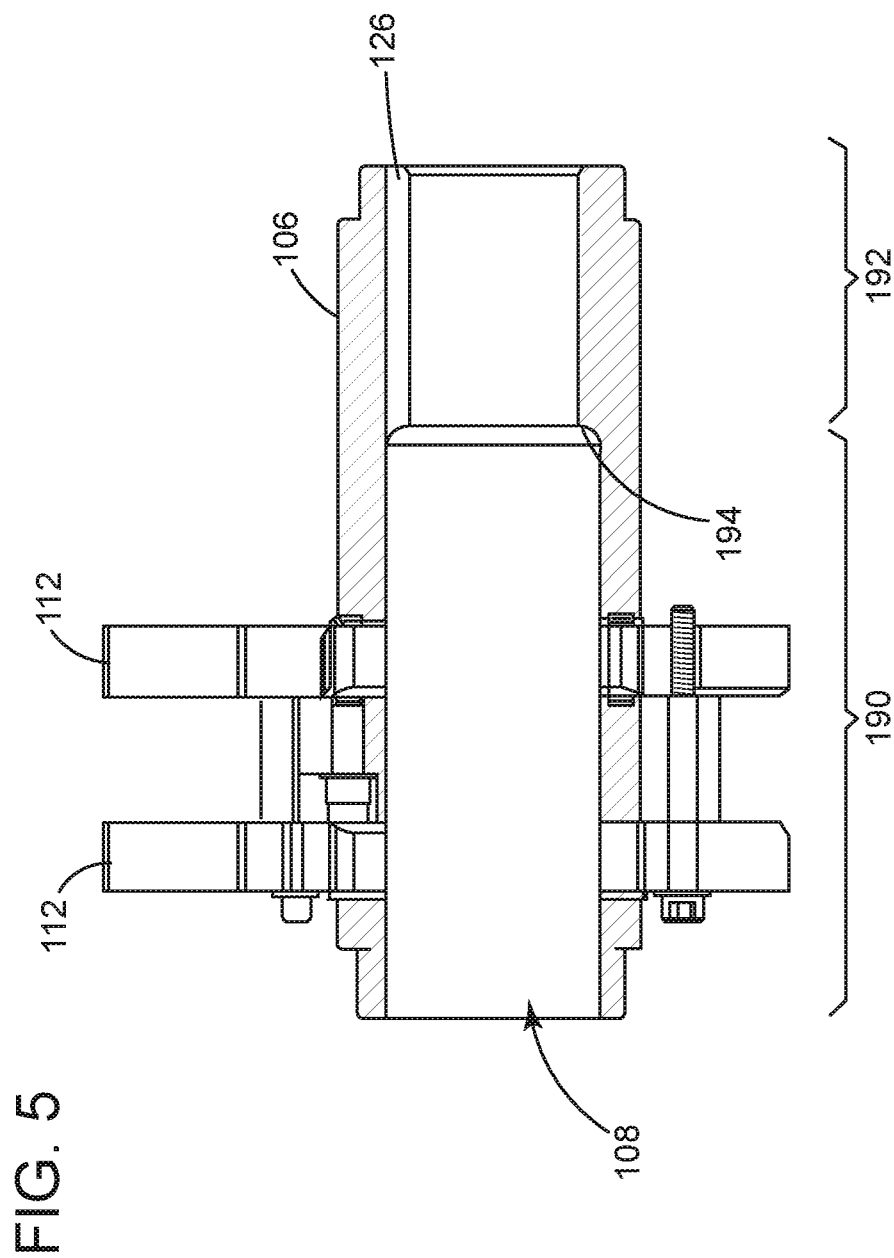
Figure 6:
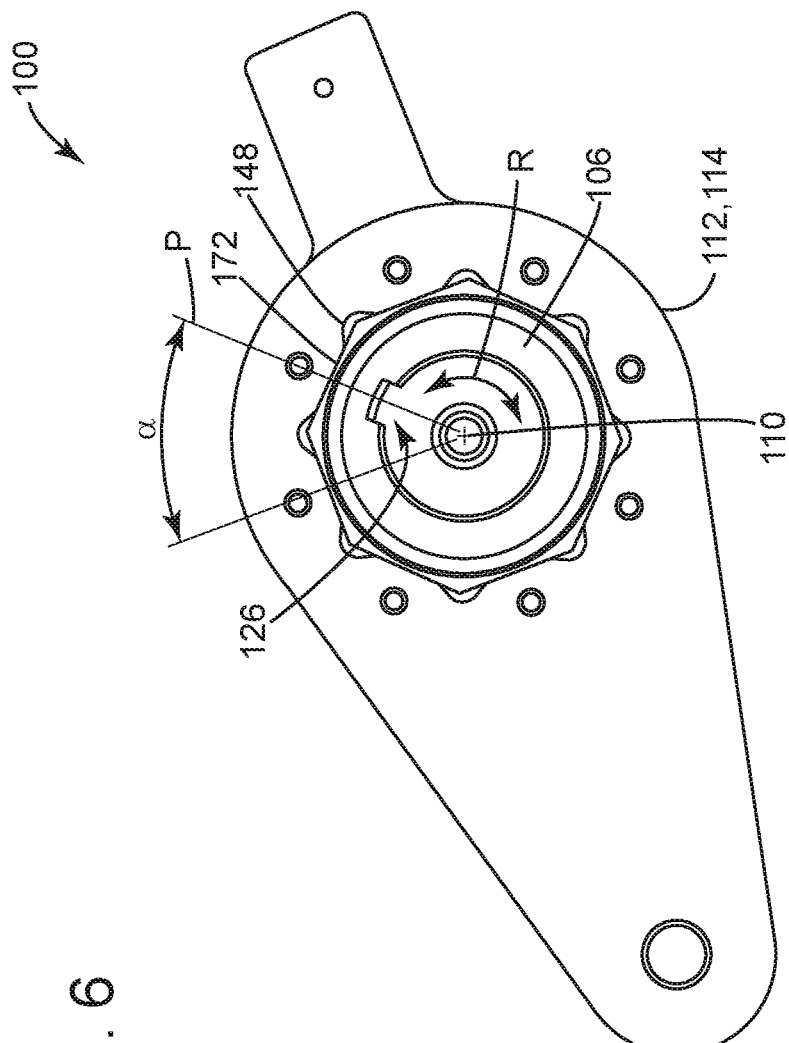
Figure 7:
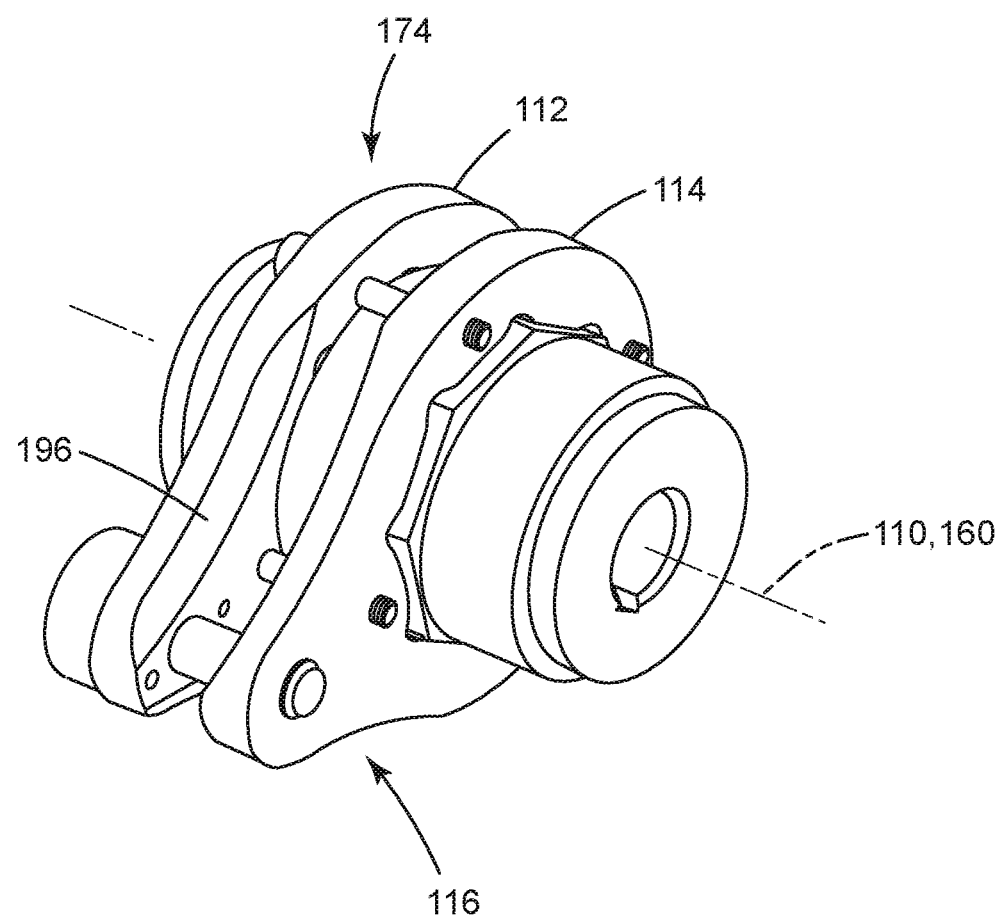
Figure 8:
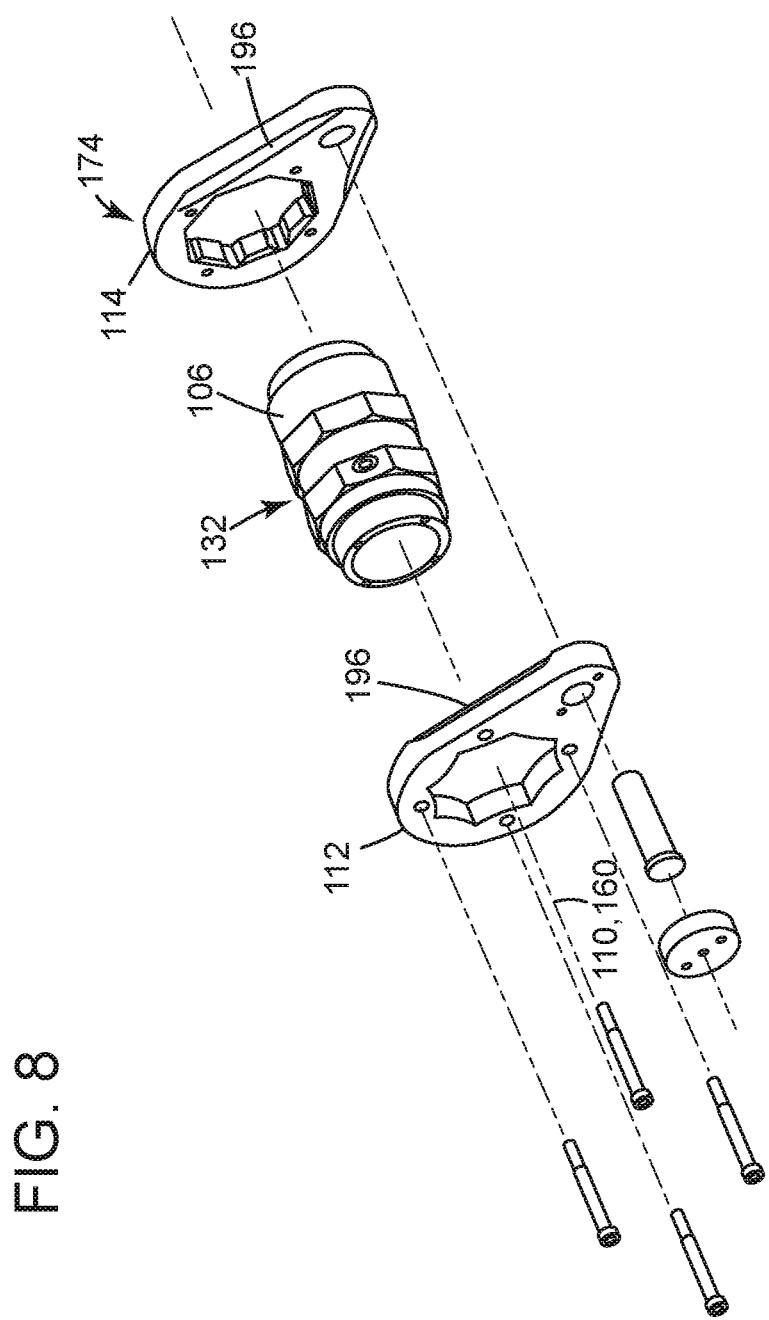
Figure 9:
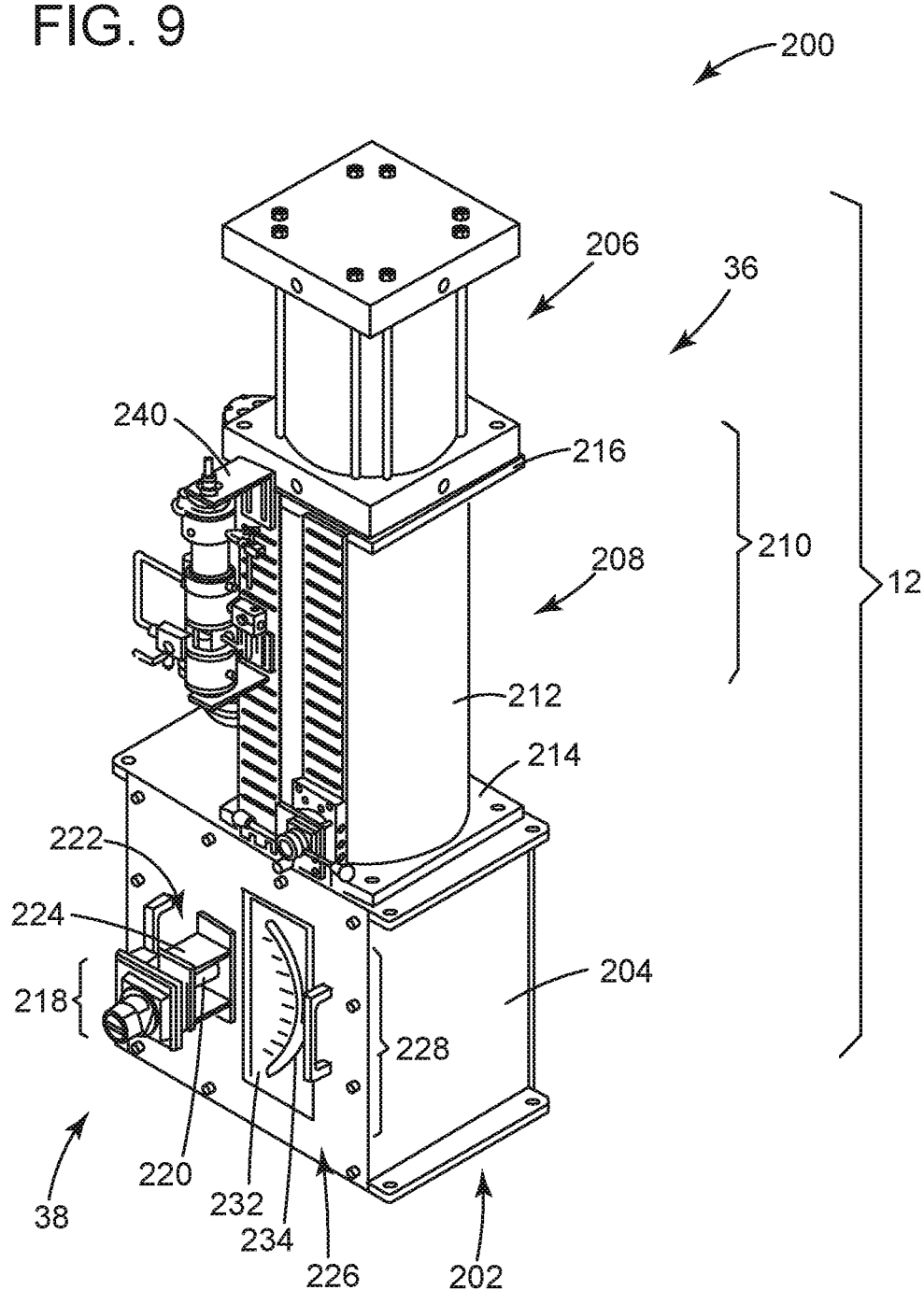
Figure 10:
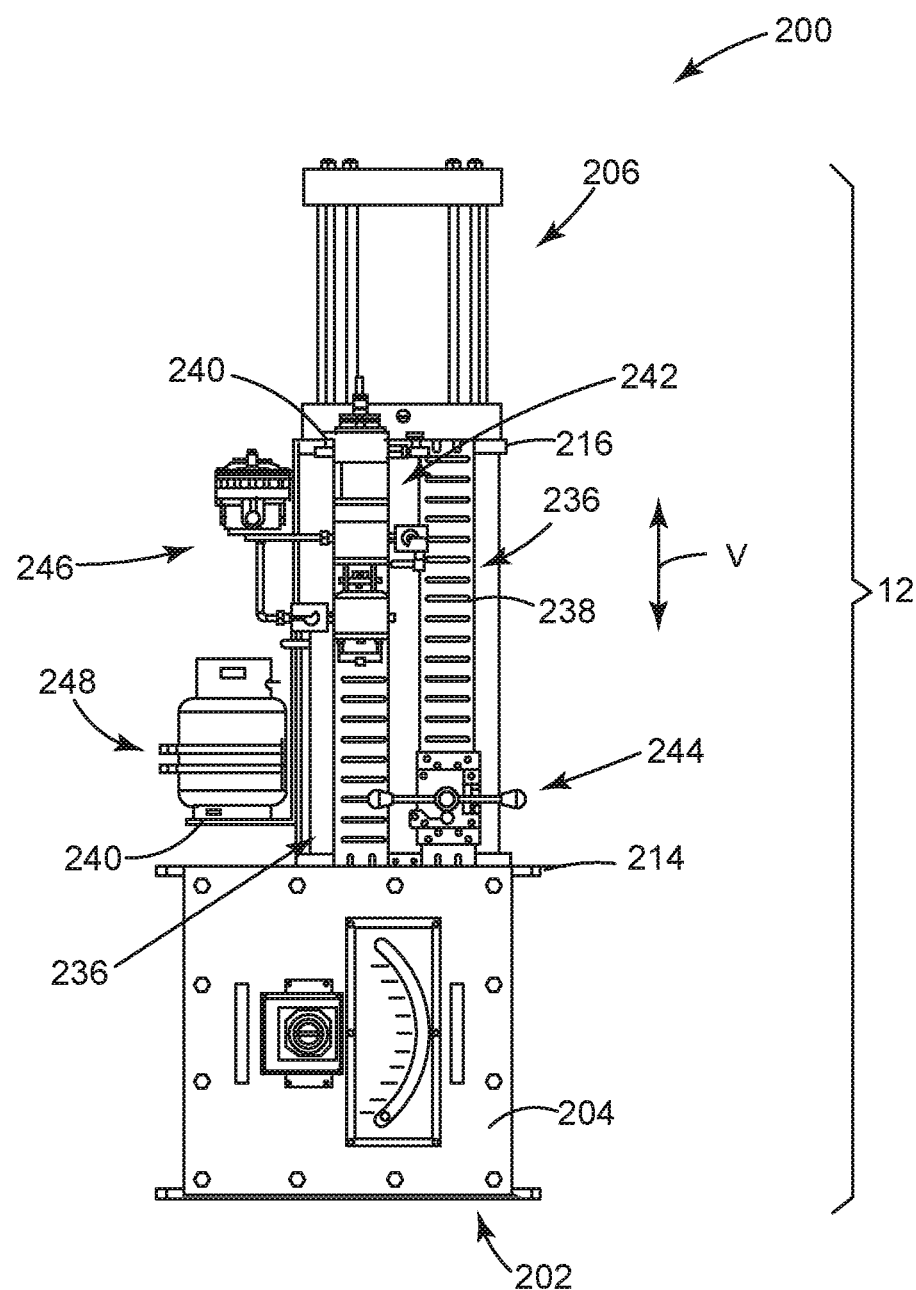
Figure 11:
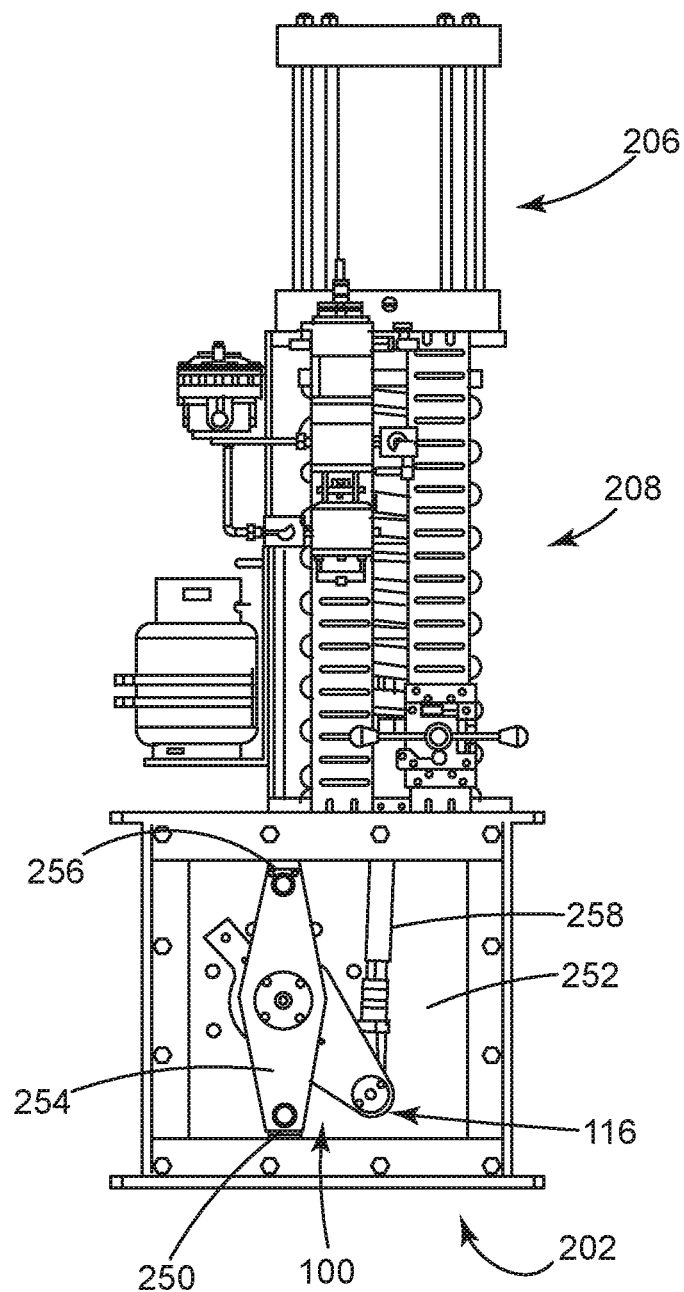
Figure 12:
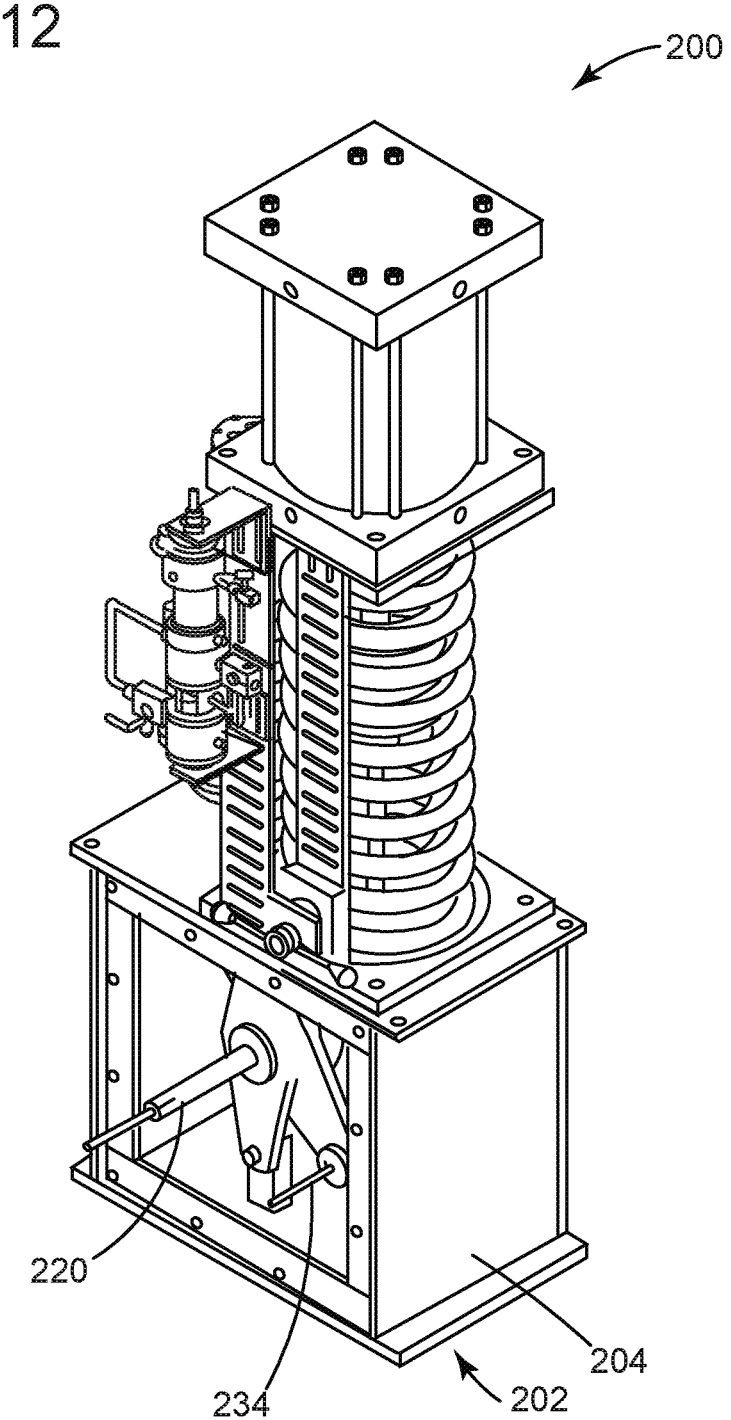
Figure 13:
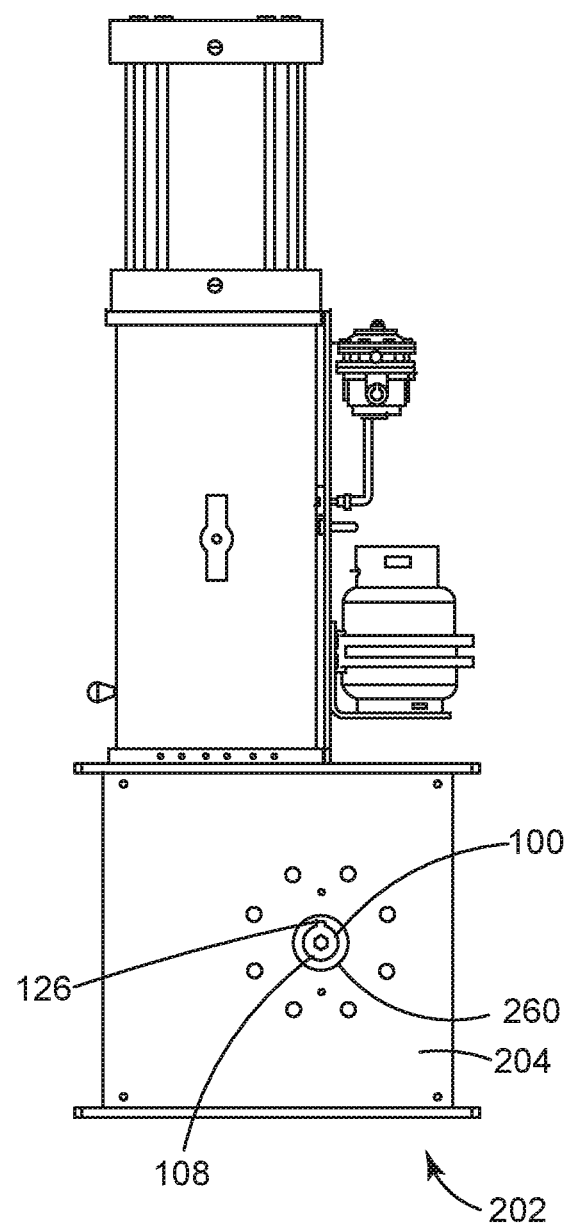
Figure 14:
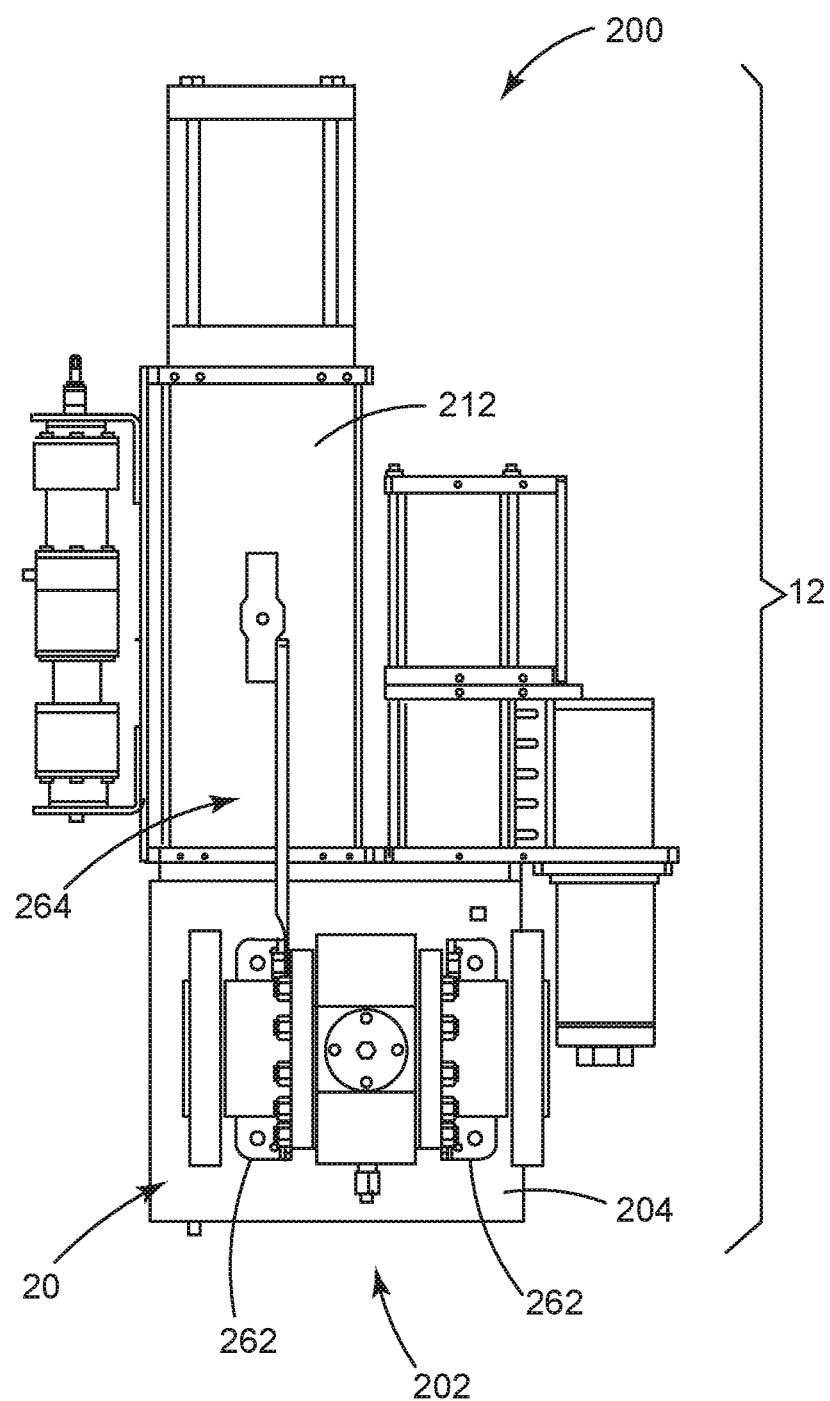
Figure 15:
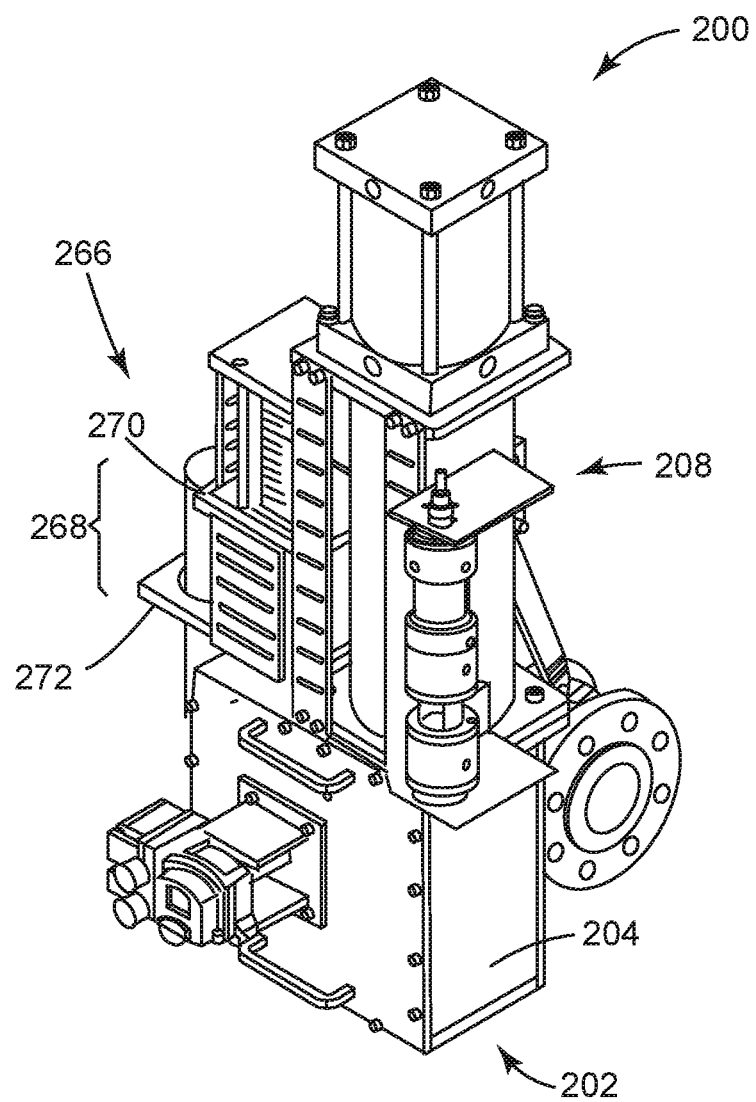
Figure 16:
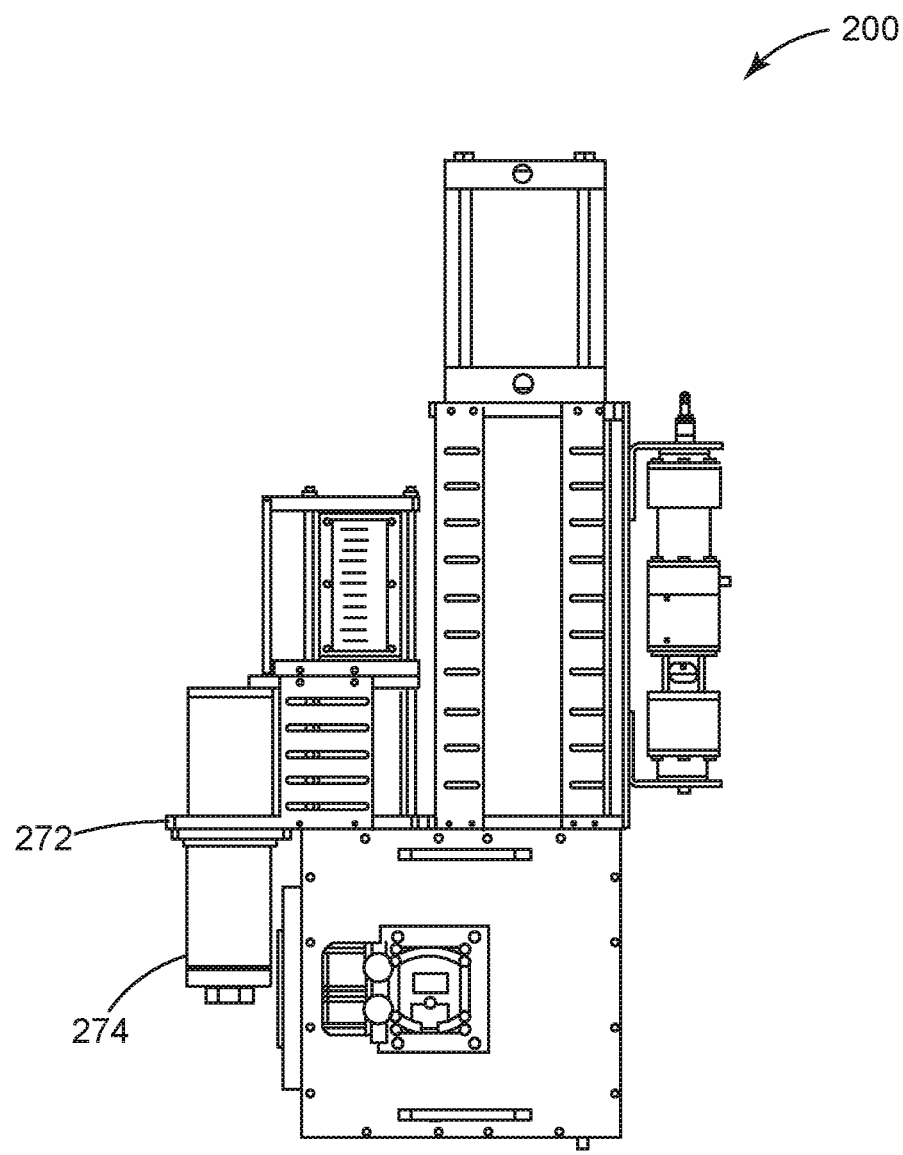
Figure 17:
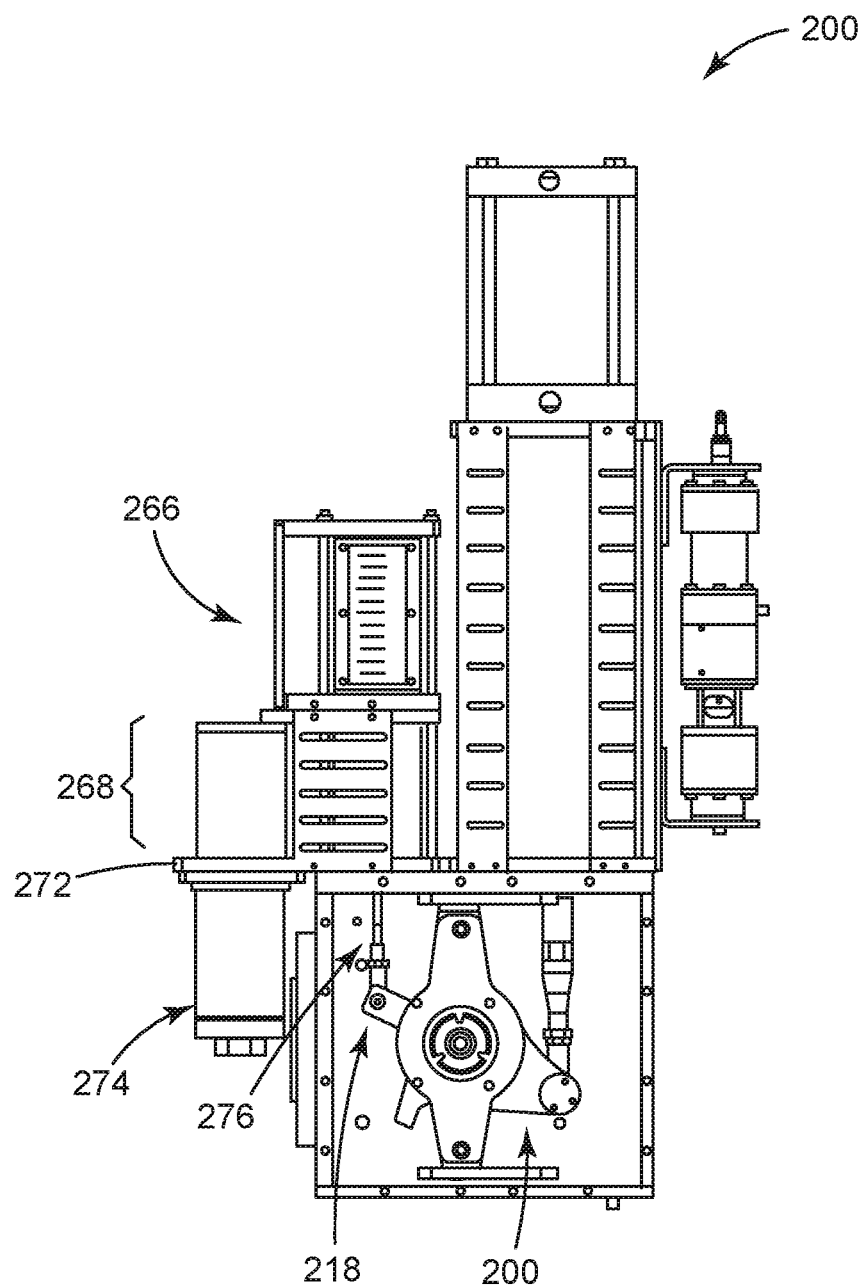
Figure 18:
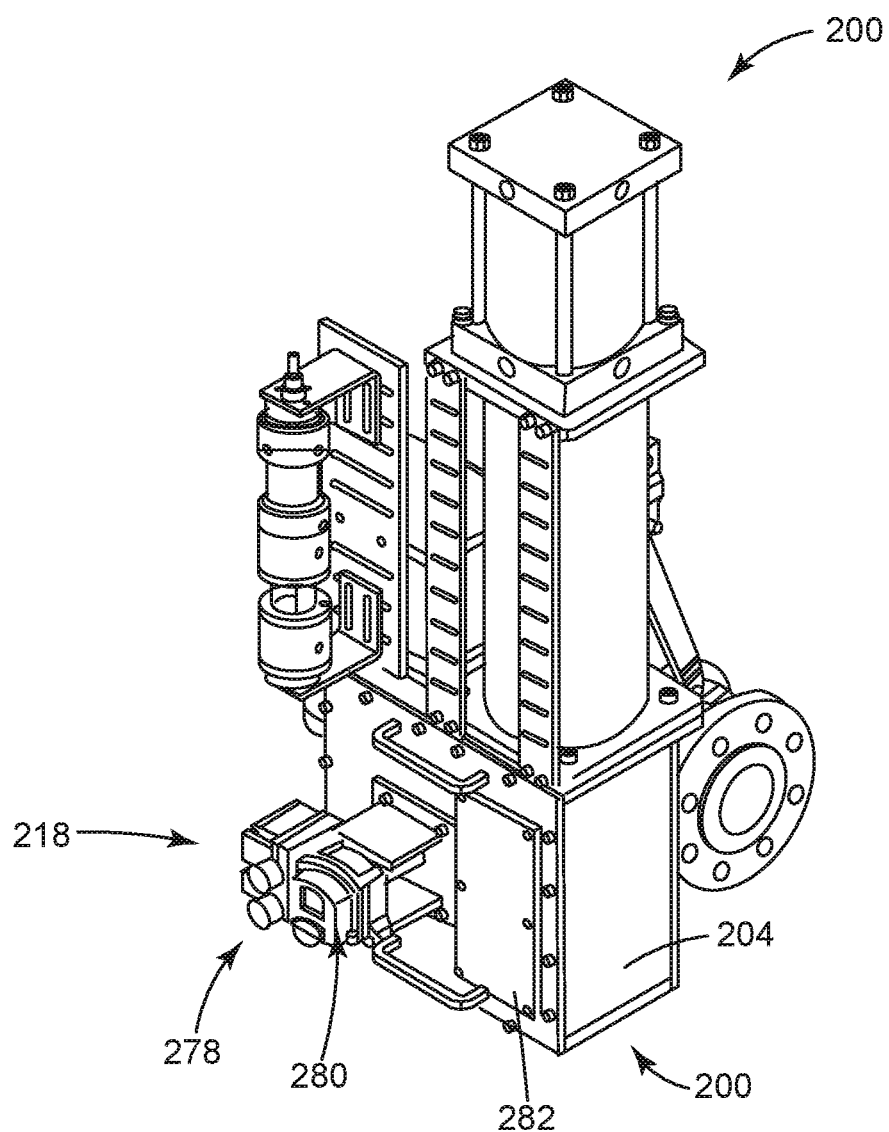
Figure 19:
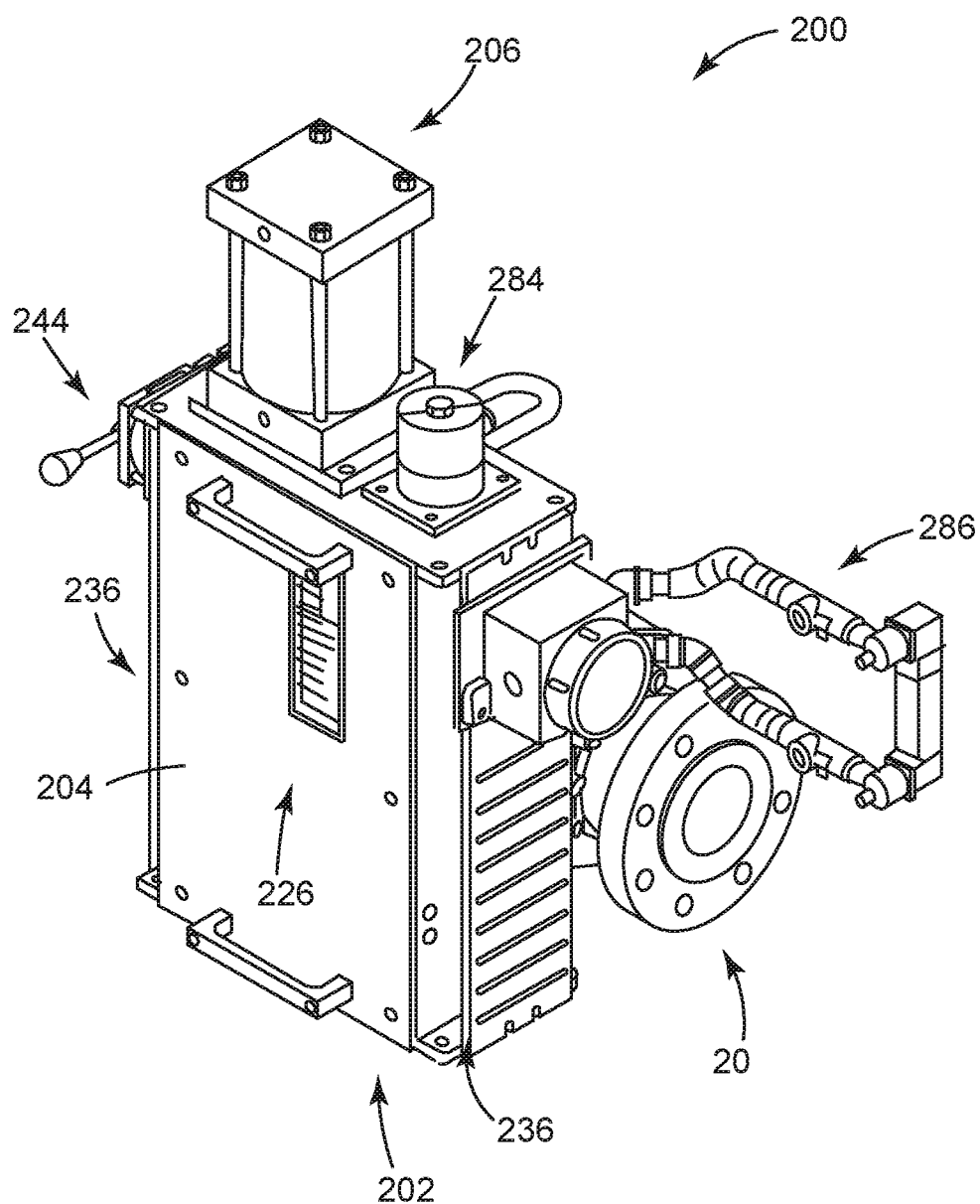
Figure 20:
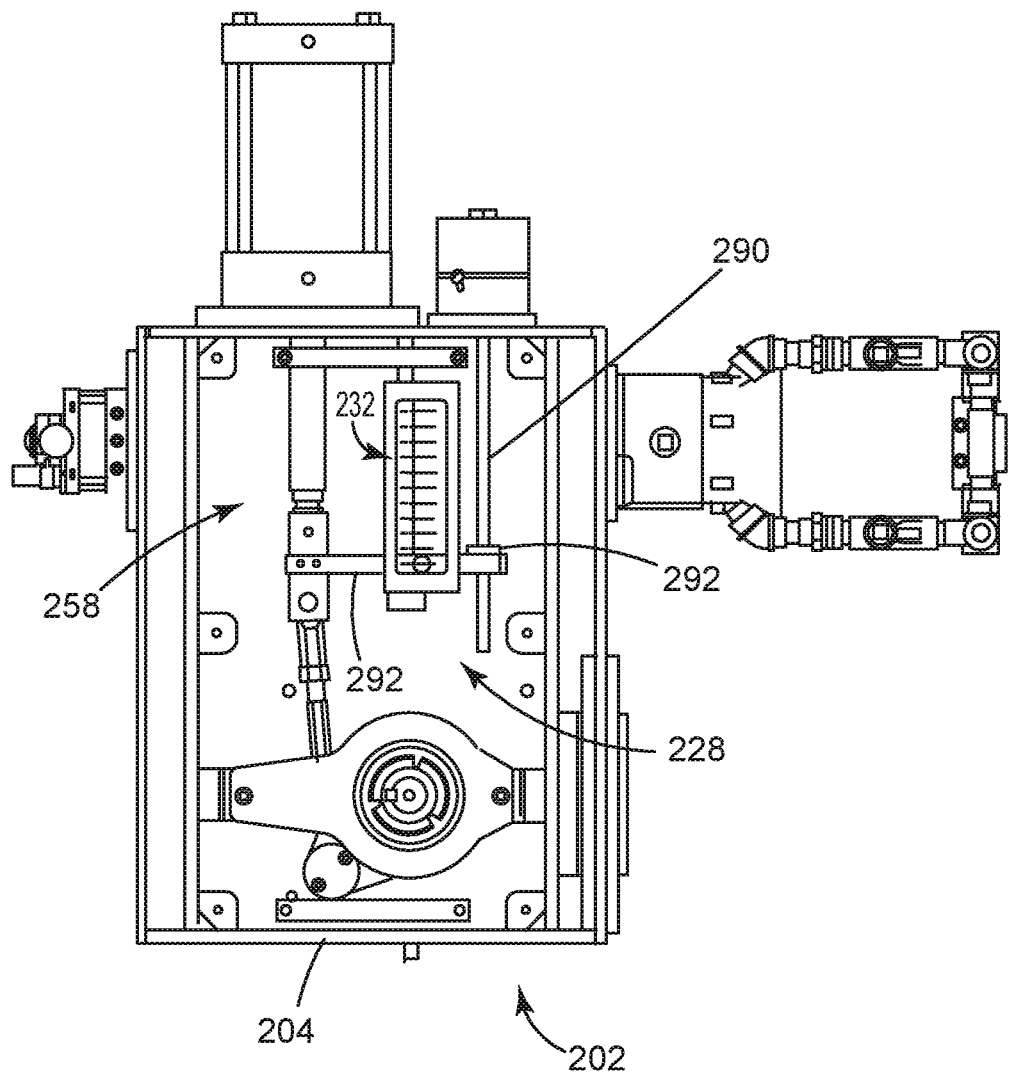

Reference is now made briefly to the accompanying drawings, in which:

FIG. 1 depicts a schematic diagram of an actuator;
FIG. 2 depicts a perspective view of an example of a torque hub for use in the actuator of FIG. 1;
FIG. 3 depicts a perspective view of the torque hub of FIG. 2;
FIG. 4 depicts the torque hub of FIG. 2 in exploded form;
FIG. 5 depicts an elevation view of the cross-section of the torque hub of FIG. 2;
FIG. 6 depicts an elevation view of the back of the torque hub of FIG. 2;
FIG. 7 depicts a perspective view of an example of a torque hub for use in the actuator of FIG. 1;
FIG. 8 depicts the torque hub of FIG. 7 in exploded form;
FIG. 9 depicts a perspective view of an example of a control valve assembly that can included the actuator of FIG. 1;
FIG. 10 depicts an elevation view of the front of the control valve assembly of FIG. 9;
FIG. 11 depicts the control valve assembly of FIG. 10 with parts removed for clarity;
FIG. 12 depicts a perspective view of the control valve assembly of FIG. 11;
FIG. 13 depicts an elevation view of the back of the control valve assembly of FIG. 9;
FIG. 14 depicts an elevation view of the back of an example of the control valve assembly of FIG. 9;
FIG. 15 depicts perspective view of the control valve assembly of FIG. 14;
FIG. 16 depicts an elevation view of the front of the control valve assembly of FIG. 14;
FIG. 17 depicts the control valve assembly of FIG. 16 with parts removed for clarity;
FIG. 18 depicts a perspective view of an example of a control valve assembly that can included the actuator of FIG. 1;
FIG. 19 depicts a perspective view of an example of a control valve assembly that can included the actuator of FIG. 1; and
FIG. 20 depicts an elevation view of the front of the control valve assembly of FIG. 19.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion that follows describes embodiments of actuators that are rugged, heavy duty devices. These embodiments have components made of materials, like steel, that can withstand the high loads necessary for the actuator to operate valve assemblies on high pressure oil and natural gas pipelines. But rather than use large, pre-formed units, formed as weldments or castings, the embodiments leverage units that are of multi-piece designs. Additional components like pilot valves and cylinders can then integrate with these multi-piece units to finish assembly of the actuator. As discussed more below, this construction avoids extensive re-work in order to reduce the costs in time and labor necessary to assemble, ship, and install the actuator in the field. Other embodiments are within the scope and subject matter of this disclosure.

FIG. 1 illustrates a schematic diagram of an exemplary embodiment of an actuator 10. This embodiment is shown as part of a control valve assembly 12, where the embodiment is useful to operate a process device 14 to regulate flow of material 16 through a conduit 18. Examples of the conduit 18 may be part of a pipeline or a distribution system that carries hydrocarbon fluids (e.g., oil and natural gas). But the material 16 may also comprise solids and solid/fluid mixes, as well. In this regard, the process device 14 may embody a valve assembly having a valve 20 with a closure member 22 and a seat 24. The actuator 10 may employ a structure 26 with a housing 28 to support the valve 20. The structure 26 may also include a modular mounting system 30 to connect collateral components, identified generally by the numeral 32. The collateral component 32 may include, for example, pilot valves, manual controls, bleed valves, sensors, pressure instrumentation, and the like. Inside the housing 28, the structure 26 includes a torque hub 34 that couples a load generator 36, like a pneumatic cylinder, with the closure member 22. The torque hub 34 may also couple with a controller 38, often by converting an incoming control signal to a proportional pneumatic signal for use at the load generator 36. In turn, the torque hub 34 transfers a load L from the load generator 38 to locate the closure member 22 in a prescribed position relative to the seat 24. This position sets the flow of material through the valve 20.

Broadly, the structure 26 leverages construction to simplify manufacture and assembly of the control valve assembly 12. Such construction may take advantage of multi-piece designs in place of castings and weldments (or "unitary structures") that might find use for these types of devices because of the rugged and robust nature necessary for their design. The structure 26 maintains these preferred characteristics, while at the same time providing additional benefits that save on costs in labor and time, both in manufacture and during installation in the field. For example, the housing 28 is configured to avoid much rework and secondary or tertiary fabrication steps (e.g., machining) to finally assemble and ship the control valve assembly 12. These configurations are effective to reduce tolerance issues that can lead to longer lead times. The design also locates the torque hub 34 for ready access, for example, via a removable door or panel on the housing 28. The modular mounting system 30 is effective to allow for rapid integration of the collateral components 34 in the control valve assembly 12. And the multi-piece design of the torque hub 30 allows a technician to accommodate for fit up issues of the control valve assembly 12 onsite at the installation or facility. This feature accommodates for physical interferences not found or determined in the original layout that defines the position of equipment on "paper." Engineers and designers may not recognize these issues during initial solid modeling. But interferences can preclude positioning of the control valve assembly, for example, within proximity to certain other components. These issues may result in significant expense and time lost because of the need to re-order new parts or re-work existing parts to properly install the valve assembly.

FIGS. 2 and 3 depict a perspective view of an example 100 of the torque hub 30 in assembled form. Referring first to FIG. 2, the example includes one or more parts (e.g., a first part 102 and a second part 104). The first part 102 (or "torque body 102") may comprise an elongate cylinder 106 having a central bore 108 with a longitudinal axis 110. The second part 104 (or "torque arm 104") may comprise one or more torque plates (e.g., a first torque plate 112 and a second torque plate 114). The plates 112, 114 may form one or more connections (e.g., a first connection 116 and a second connection 118), both of which may be radially offset from the longitudinal axis 110. The connections 116, 118 may engage with the actuator 10 (FIG. 1) or with collateral components 32 (FIG. 1), as discussed more below. In one implementation, the connections 116, 118 may be configured as joints, for example, as joints formed by a pin 120 that extends between the plates 112, 114 (shown only at the first connection 116, but also possible at the second connection 118); however this structure here should not work to limit the possible types of joints contemplated herein. A pin cover 121 might be included over part of the pin 120 at the connections 116, 118 as well. This element may releasably engage with the plates 112, 114 to provide structure to engage with components (e.g., a shaft) that are useful to indicate position of the torque arm 104. An orifice or aperture may be helpful for this purpose.

The example also includes a fastening mechanism that is useful to couple the cylinder 106 and the plates 112, 114. The fastening mechanism may embody interfacing geometry 122 found on the cylinder 106 and plates 112, 114. Fasteners 124 may also be useful to releasably engage the cylinder 106 and the plates 112, 114. As best shown in FIG. 3, the cylinder 106 may include a connecting feature 126, shown as a keyway or slot that is formed in the central bore 108. When assembled with the valve 20, the keyway 126 is configured to engage with a complimentary boss (or like element) found on a shaft that connects to the closure member 22 (FIG. 1). This configuration is useful to cause this shaft to co-rotate with cylinder 106 relative to the plates 112, 114, as indicated by the arrow denoted R about the longitudinal axis 110. Rotation R changes the angular position.alpha. of the keyway 126 relative to the connections 118, 120, which in turn is useful to quickly orient the valve 20 (FIG. 1) due to interferences with adjacent equipment or like issues that would normally derail installation and require new or reworked parts.

FIG. 4 illustrates the example of FIG. 2 in exploded form. Starting with the torque body 102, the cylinder 106 may have an outer surface 128 of varying dimensions (e.g., diameter). These dimensions may form an engagement region 130 that is configured to receive and engage the plates 112, 114. This configuration may include a central shoulder portion 132 that forms a pair of faces (e.g., a forward face 134 and a rearward faces 136). Openings may populate the faces 134, 136, preferably in an array that circumscribes the longitudinal axis 110. The openings may comprise threaded holes 140 and counter-bored apertures 142. However, the actual geometry of the openings 140, 142 may vary as necessary to allow fasteners 124 to engage or pass through the material of the cylinder 106 in a number sufficient to secure the cylinder 102 and the plates 110, 112 under load L. Adjacent the central shoulder portion 132, the engagement region 130 may also include one or more flatted portions (e.g., a first flatted portion 144 and a second flatted portion 146). The flatted portions 144, 146 may include features, shown here as flats 148, that populate the outer surface 128 of the cylinder 106. As also shown, the dimensions of the outer surface 128 may form other areas (e.g., a first area 150, a second area 152, and a third area 154) that may be useful to receive other components of the control valve assembly 12 (FIG. 1), as noted further below.

The plates 112, 114 may be configured to locate adjacent the faces 134, 136 of the central shoulder portion 132. These configurations may have a thin body 156, preferably comprising materials (e.g., metals, composites, etc.) that exhibit sufficient strength and stiffness (and other relevant physical properties) for the load L. The thin body 156 may have a central aperture 158 with an axis 160. The central aperture 158 may form an interior surface with flats 164 that circumscribe the axis 160. At least some of the flats 164 may be configured with geometry complimentary to the geometry of the flats 148 on the flatted portions 144, 146 of the cylinder 106. The complimentary geometry is useful to direct the load L to the cylinder 106 and, in turn, rotate the shaft that couples with the closure member 22 (FIG. 1). In one implementation, the interior surface between the flats 164 may also include stress relieving features. These features may take the form of chamfers 168 and fillets 170. But the form does not necessarily limit the stress relieving feature, as other geometry may be helpful as well.

Looking at the exterior of the plates 112, 114, the thin body 156 may have a form factor of varying design. Geometry for the form factor may accommodate space and interferences inside the housing 28 (FIG. 1), but also promote ease and simplicity of manufacture (e.g., using laser cutting or punch presses, for example). As shown here, the form factor may define a peripheral edge 172 having a first annular region 174 disposed about the axis 160. The first annular region 174 may give way to boss region 176, which extends longitudinally away from the axis 160. The boss region 176 may be square at its end, but other geometries (e.g., annular) may also result from fabrication. A second annular region 178 may be formed at a location that is spaced radially away from the axis 160. The form factor may further form a shaped region where the thin body 156 transitions between the annular regions 174, 178. In this transition, the peripheral edge 172 on opposite sides of the thin body 156 may taper inwardly, or toward one another, from the larger diameter of the first annular region 174 to the smaller diameter of the second annular region 178. In one implementation, the thin body 156 may include a plurality of openings, shown here as a pin openings 180 in the regions 176, 178 to receive the pins 120 at the connections 116, 118. Fastener openings 182 may be dispersed across the face of the body 156, including circumscribing the central aperture 158. The fastener openings 182 may receive fasteners 124, shown here in three sets (e.g., a first set 184, a second set 186, and a third set 188).

FIG. 5 illustrates an elevation view of the cross-section of the example of FIG. 2 taken at line 4-4. The central bore 108 may include one or more sections (e.g., a first section 190 and a second section 192). The sections 190, 192 may be of different diameters to form a shoulder 194. In one implementation, the first section 190 is sized and configured to receive at least a portion of a first shaft that couples with the controller 38 (FIG. 1). The second section 192 may, in turn, receive at least a portion of a second shaft (or "valve shaft") that couples with the closure member 26 (FIG. 1).

FIG. 6 depicts an elevation view of the back of the example of FIG. 2. The keyway 126 may have a cross-section that is square or rectangular, but annular may suffice as well. The cross-section may be arranged so that a plane P, which extends through the longitudinal axis 110, bisects both the keyway 126 and one of the flats 148 on the cylinder 106. This arrangement may be important to also align the keyway 126 (and, in turn the valve shaft), with flats 172 on the plates 112, 114. In this regard, rotation R of the cylinder 106 will cause the annular position α to change from a first annular position to a second annular position that corresponds to a different flat 172 on the plates 112, 114.

FIGS. 7 and 8 illustrate a perspective view of an example of the torque hub 30 in both assembled form (FIG. 7) and exploded form (FIG. 8). In this example, the first annular region 174 continues about the axis 160 in lieu of the boss region 176 (FIG. 4) discussed previously. This configuration may be used when only one connection (e.g., the first connection 116) is required for operation of the control valve assembly 12 (FIG. 1). As best shown in FIG. 7, one or more of the plates 112, 114 may also include a curved recess 196 that extends along a portion of the peripheral edge 172. The curved recess 196 effectively removes or carves away material of the plates 112, 114. Further, the central shoulder portion 132 features a reduced diameter to allow fasteners 128 to bypass material of the cylinder 106 to extend between plates 112, 114.

FIG. 9 depicts a perspective view of an example 200 of the control valve assembly 12. The housing 28 may form an enclosure 202 with one or more walls 204, made and fastened to one another in a way sufficient to support several of the components of the apparatus 100 as well as the process device 14. The walls 204 may be thin, metal plates made of steel or of materials so as to exhibit physical properties (e.g., rigidity, strength, stiffness, etc.) necessary to support, at least in the aggregate, the corresponding components that affix, fasten, or are disposed thereon. Fasteners including screws, bolts, and the like may be useful to couple adjacent ones of the walls 204 together. Such construction is useful to allow for rapid assembly, as opposed to, for example, fully welded structures; however, it is contemplated that the use of fasteners may combine with other fastening techniques (e.g., welds) for this purpose. Parts of the enclosure 202 may also be formed a casting or cast part or machined from a single billet (block). In one example, one or more of the walls 204 may be clear or provide some optical transparency to allow visual inspection of the inside of the enclosure 202.

The load generator 36 may be configured to reside on one of the walls 204 (or the "top wall") of the enclosure 202. This configuration may include a pneumatic cylinder 206 and a spring cartridge 208, which is effective to return or set the condition of the process device 14 (FIG. 1) in the event of power or pneumatic outage or other problems at the cylinder 206. The spring cartridge 208 may include a column structure 210 having a generally cylindrical column 212 with one or more interface plates (e.g., a first interface plate 214 and a second interface plate 216) disposed on either end. The cylindrical column 212 may form a tube that is hollow and open at either end. The interface plates 214, 216 can also be thin, metal plates that are disposed between the column 212 and the cylinder 206 (e.g., plate 214) and the column 212 and the top wall of the enclosure 202 (e.g., the plate 216). The plates 214, 216 can be configured to receive fasteners. This configuration is useful to secure the cylinder 206 to the spring cartridge 208 as well as to secure the spring cartridge 208 in position on the top wall of the enclosure 202.

The controller 38 may be configured to couple with one of the walls 204 (or the "front wall") of the enclosure 202. This configuration may include a positioner 218 that resides on the front wall of the enclosure 202. The positioner 218 may couple with a control shaft 220 that extend through the front wall and couples with the torque hub (not shown). The positioner 218 may reside on a control mount 222 that itself couples to the front wall. The control mount 222 may configured with individual, metal plates 224, but this design may also give way to various configurations of parts or unitary monolithic design. The configuration spaces the positioner 218 off of the front wall of the enclosure 202, may dampen vibration and shock, as well as avoid other perturbations that could frustrate operation of the positioner 218.

The controller 38 may include a position indicator 226 that is useful to indicate the state or condition of the process device 14 to an observer. The position indicator 226 may form a gauge 228. In one example, indications on the gauge 228 correspond with the position (or movement) of the closure member 26 (FIG. 1). These indications may be part of a mechanical indicator with one or more piece parts that mount to the front wall or, even, that integrate as machined features in the front wall of the enclosure 202. Suitable machine features may include an arcuate slot 230 that exposes the interior of the enclosure 202. Demarcations 232 such as lines may also reside proximate the slot 230 be useful for this purpose. An indicator shaft 234 may extend from the torque hub (e.g., from the pin cover 121, not shown) into or proximate the slot 230. These piece parts operate as a mechanical indicator, for example, where the location of the indicator shaft 134 may correspond to the position of the first connection 116 (FIG. 1). However, this disclosure also contemplates use of display technology (e.g., screens, displays, etc.) that could provide some type of visual interface for the observer to realize the movement or position of the closure member 26 (FIG. 1).

FIG. 10 depicts an elevation view of the example 200 of FIG. 9. The modular mounting system 30 is configured for rapid assembly of components without resort to significant rework or reprocessing of parts. This configuration may include mounting members 236 for this purpose. Examples of the mounting members 236 may be thin, elongate plates with one or more apertures 238 in the form of slots and holes, but geometry can vary to accommodate any design. The apertures 238 may be dispersed in one or more of the longitudinal and axial directions on each of the plates. In one implementation, the plates can attach to the interface plates 214, 216. The modular mounting system 30 may also include one or more brackets 240. In use, the brackets 240 may couple with the plates 236 using fasteners (e.g., screws, bolts, etc.) pins, bosses, and like elements. The plates 236 and brackets 240 can support, for example, collateral components like a pilot valve 242, manual control 244, bleed valve 246, and canister 248. At least one benefit of the configuration of these pieces, however, is that they allow for variations in the position of these components in, for example, a vertical direction V based on which of the apertures 238 the device secures to on the plate 236.

FIGS. 11 and 12 depict the example of FIG. 10 with parts removed to facilitate the discussion. Starting with FIG. 11, which shows an elevation view, the walls 204 create an interior cavity 252 that is hollow (or at least partially hollow). The interior cavity 252 can be sized for certain components to support the torque hub 100. The components may include a bearing bracket 254 that affixes to the walls 204 of the enclosure 202 via, in one example, one or more housing brackets 256. A connecting rod 258 may couple at the first connection 116. The connecting rod 258 may extend through the spring cartridge 208 to couple with the cylinder 206. As best shown in the perspective view of FIG. 11, the shafts 220, 234 can couple with the torque hub 100. The control shaft 220 may couple with the torque body 102. The indicator shaft 234 may couple at the first connection 116. In operation, rotation of the torque hub 100 will cause corresponding movement in the shafts 220, 234, which in turn communicates this movement to the respective controller. For the indicator shaft 234, the offset of the first connection 116 will swing the shaft 234 in an arc that matches the arcuate slot 230 for the gauge 228 (FIG. 9).

FIG. 13 depicts an elevation view from the back of the example 200 of FIG. 10. An aperture 260 in one of the walls 204 (the "back wall") exposes the cylinder 106 of the torque hub 100. This feature provides access to the keyway 126. When assembled, the valve shaft may extend through the aperture 260 to engage with the cylinder 106, often inserting into the bore 108 to engage its corresponding boss feature with the keyway 126.

FIG. 14 depicts an elevation view of the back the example 200 of the control valve assembly 12, shown here with some additional components that outfit the device to satisfy certain functional specifications. The example 200 includes one more valve brackets 262 to mount the valve 20 to one of the walls 204 (the "back wall") of the enclosure 202. The example may also include bracketry 264 that is configured to extend from the column 212 to the valve 20. The bracketry 264 may additionally support the weight of the valve 20, thus reducing any cantilever loading that may occur on the back wall of the enclosure 202.

FIGS. 15 and 16 depict the example 200 of FIG. 14 in perspective (FIG. 15) and front, elevation (FIG. 16). The gauge 228 may form a stand-alone unit 266 in lieu of the integrated design on the enclosure 202 discussed above. The stand-alone unit 260 may reside on a secondary column 268 found next to the spring cartridge 208 on the top wall of the enclosure 202. The secondary column 268 may comprise a steel tube with cylindrical or square cross-section, although geometry preference may be given to other structures as well. The example 200 may also include a pair of interface plates (e.g., a third interface plate 270 and a fourth interface plate 272), one each to secure the steel tube to the top wall of the enclosure 202 and to secure the stand-alone unit 266 in position on the structure 200. As best shown in FIG. 15, the interface plate 272 may have a portion that extends outwardly from the top wall of the enclosure 202. This portion may be configured (with an aperture or hole) to retain a filter 274 that filters particulates from incoming "instrument" fluid that is used to operate the cylinder 206.

FIG. 17 illustrates the front, elevation view of FIG. 16 with the front wall of the enclosure 202 removed for clarity. The example 200 may include a second connecting rod 276 that couples on one end with the torque hub 100. The connecting rod 276 extends into the secondary column 268 to the stand-alone unit 266 of the gauge 228. At the end, the connecting rod 276 may comprise some intermediary component that can interface with the gauge 228 to give proper indication of the position of the valve 20.

FIG. 18 depicts a perspective view of the example 200 of the control valve assembly 12. Here, some components are arranged in slightly different orientation. The positioner 218 may include an integrated display in the form of one or more dial gauges 278 and a display 280. The integrated display may forgo the need for the position indicator (e.g., positioner indicator 226). In this regard, the example 200 may leverage a cover plate 282, or like implement, to obscure any of the indication or demarcations that might be found on the front wall of the enclosure 202.

FIGS. 19 and 20 depict the example 200 of the control valve assembly 12. Other components may be included on the device to satisfy certain additional functional specifications. The example 200 may include one or more additional collateral devices (e.g., a first device 284 and a second device 286). These collateral devices, like the ones noted before, can afford the control valve assembly 12 with certain functionality like pressure regulation, filtering, measurement, etc. As best shown in FIG. 20, the position indicator 226 includes an indicating mechanism 288 that attaches to the first connecting rod 258. The indicating mechanism 288 may include a shaft 290 that extends vertically from the top wall of the enclosure 202. A moveable member 292 may couple with the connecting rod 258. The moveable member 292 may extend to the shaft 290, possibly carrying a bearing 294 disposed therein that circumscribes the shaft 290. In use, movement of the connecting rod 258 will displace the moveable member 292 to a position that corresponds with one of the demarcations 232 on the gauge 228.

In view of the foregoing discussion, the embodiments herein improve construction and use of actuators found as part of control valve assemblies. These improvements simplify the design to avoid unnecessary parts and labor, while at the same time reducing the need to rework existing parts for fit-and-function. At least one other benefit of the subject matter herein is to configure the device to adapt to changes in the field. This feature may be of benefit to avoid interferences at the time the device installs into the facility or location.

Further, this disclosure contemplates that replacement parts may be need and acquired in the aftermarket for the control valve assembly. In this connection, one or more of the replacement parts for the control system 100 may be formed by existing parts. For example, parts of the coupling mechanism 112 or torque assembly 200 may lend itself to refurbishing and like processes to prepare the existing parts into condition and/or specification for use as the replacement part in the structure. Exemplary subtractive manufacturing processes may include buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into control valve assembly as a wholly-constructed assembly. In other implementations, the replacement parts may embody individual parts (e.g., the torque hub 10 or its pieces), as well as combinations and compilations thereof, possibly in the form of one or more sub-assemblies.

Exemplary processes to manufacture these parts may leverage additive manufacturing techniques, alone or in combination with one or more other types of subtractive manufacturing techniques. The process can include configuring an additive manufacturing machine with executable instructions that define a net shape. The net shape can embody the torque hub 100 in whole or in part, including, for example, configurations of the body 106 or plates 112, 114 described hereinabove. The process may also include growing the net shape and, where necessary performing one or more post-growth processes on the net shape.

Implementations of the process 300 can render embodiments of the torque hub 100 or other components of the control valve assembly 200. These implementations may result in, for example, control valve assembly comprising a torque assembly with components (e.g., the body 106) made by the process of configuring an additive manufacturing machine with executable instructions that define a net shape, growing the net shape, and performing one or more post-growth processes on the net shape. Such implementation that result in these parts are also contemplated wherein the one or more post-growth processes comprises heat treating the net shape, and/or comprises de-burring the net shape, and/or comprises machining the net shape, and/or comprises apply a surface finish to one or more surfaces of the net shape, and/or comprises removing material of the net shape using abrasives, and/or comprises inspecting the net shape to accumulate dimensional data and comparing the dimensional data to a default value.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples below include certain elements or clauses one or more of which may be combined with other elements and clauses describe embodiments contemplated within the scope and spirit of this disclosure.

The invention claimed is:

1. An actuator, comprising:
    a housing comprising a plurality of walls secured to one another with fasteners to form an interior cavity;
    a torque hub disposed in the interior cavity, the torque hub comprising a hollow cylinder and a pair of flat plates that are releasably engaged with one another via fasteners, the flat plates having an aperture to receive the hollow cylinder, each of the hollow cylinder and the flat plates having interfacing geometry that defines flats interior to aperture and exterior to the cylinder that engage with opposing flats on the other, the hollow cylinder having a longitudinal axis and the flats are disposed circumferentially about the longitudinal axis; and
    a load generator coupled with the torque hub.

2. The actuator of claim 1, wherein the flats are disposed on an outer surface of the torque body.

3. The actuator of claim 1, wherein the flats are disposed on an inner surface of an aperture on the torque arm.

4. The actuator of claim 1, wherein the pair of flat plates are spaced longitudinally apart from one another.

5. The actuator of claim 1, further comprising a pin that penetrates the pair of flat plates and is spaced radially apart from the hollow cylinder and couples with the load generator.

6. The actuator of claim 1, further comprising:
    a position indicator that couples with the torque hub, the position indicator generating a visual indicator that corresponds with an annular position of the pair of flat plates.

7. The actuator of claim 1, wherein the pair of flat plates have an engagement region forming a shoulder portion that separates the interfacing geometry into a pair of flatted portions that define the flats on the hollow cylinder.

8. The actuator of claim 1, wherein the hollow cylinder has a central bore forming a keyway at least at one end.

9. The actuator of claim 8, wherein the keyway aligns with a plane that bisects one of the flats of the interfacing geometry on the hollow cylinder.

10. The actuator of claim 1, wherein the torque hub includes a pair of pins, one each extending through openings in the pair of flat plates on radially opposite sides of the hollow cylinder.

* * * * *